(12) United States Patent
Kessler et al.

(10) Patent No.: US 10,511,120 B2
(45) Date of Patent: Dec. 17, 2019

(54) CABLE BUSHING ARRANGEMENT

(71) Applicant: STABILUS GMBH, Koblenz (DE)

(72) Inventors: Jonathan Kessler, Grossholbach (DE); Christof Theis, Hillscheid (DE); Jan Bochen, Eitelborn (DE); Marian Bochen, Eitelborn (DE); Eduard Jost, Hilgert (DE); Axel Knopp, Eitelborn (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 16/272,440

(22) Filed: Feb. 11, 2019

(65) Prior Publication Data

US 2019/0252821 A1     Aug. 15, 2019

(30) Foreign Application Priority Data

Feb. 9, 2018    (DE) ........................ 10 2018 103 016

(51) Int. Cl.
*H01R 13/52*      (2006.01)
*F16L 5/10*        (2006.01)

(52) U.S. Cl.
CPC ............ *H01R 13/5205* (2013.01); *F16L 5/10* (2013.01)

(58) Field of Classification Search
CPC ................................................ H01R 13/5205
USPC ........................................................ 439/587
See application file for complete search history.

(56) References Cited

U.S. PATENT DOCUMENTS

| | | | | |
|---|---|---|---|---|
| 4,692,562 A | * | 9/1987 | Nattel ................... | H02G 15/013 174/653 |
| 5,981,877 A | * | 11/1999 | Sakata ................ | B60R 16/0222 174/153 G |
| 6,211,464 B1 | * | 4/2001 | Mochizuki .......... | B60R 16/0222 16/2.1 |
| 6,402,155 B2 | * | 6/2002 | Sakata ................ | B60R 16/0222 16/2.2 |
| 6,941,714 B2 | * | 9/2005 | Nakamura .......... | B60R 13/0846 277/602 |
| 6,995,316 B1 | | 2/2006 | Goto | |
| 8,134,089 B2 | * | 3/2012 | Roseen ................ | H01B 17/303 16/2.2 |
| 2016/0169317 A1 | * | 6/2016 | Theis ...................... | F16H 25/20 74/424.71 |
| 2018/0019041 A1 | * | 1/2018 | Takahashi ................ | H02G 3/22 |
| 2018/0126929 A1 | | 5/2018 | Miller et al. | |

FOREIGN PATENT DOCUMENTS

| | | |
|---|---|---|
| DE | 10332035 A1 | 2/2004 |
| DE | 202016104057 U1 | 10/2017 |
| DE | 102017126024 A1 | 5/2018 |
| EP | 1705771 A2 | 9/2006 |

OTHER PUBLICATIONS

European Search Report dated May 8, 2019, 2 pages.

\* cited by examiner

*Primary Examiner* — Tulsidas C Patel
*Assistant Examiner* — Peter G Leigh
(74) *Attorney, Agent, or Firm* — Lucas & Mercanti, LLP

(57) ABSTRACT

A cable bushing arrangement for an electromotive linear actuating apparatus includes a terminal closure for a hosing of the linear actuating apparatus. The arrangement allows sealed-off routing of a cable from outside through an insertion opening in the terminal closure to a housing interior of the linear actuating apparatus.

11 Claims, 2 Drawing Sheets

CABLE BUSHING ARRANGEMENT

CROSS-REFERENCE TO RELATED APPLICATIONS

The present application claims priority to DE 10 2018 103 016.0, filed on Feb. 9, 2018, the entire contents of which are incorporated herein by reference.

BACKGROUND OF THE INVENTION

The invention relates to a cable bushing arrangement for the sealed-off routing of a cable to an electromotive linear actuating apparatus from outside through an insertion opening in a terminal closure. The electromotive linear actuating apparatus being arranged in a housing closed by the terminal closure.

A problem of cable bushing arrangements is the difficulty in achieving a sealed routing of the cable from outside the housing to the electromotive linear actuating apparatus in the housing interior.

BRIEF SUMMARY OF THE INVENTION

An object of the invention is to provide a cable bushing arrangement of the kind mentioned in the background which, with simple design and simple assembly, allows sealed-off routing of a cable out of the housing interior and also assessment of the sealing point from the outside.

According to an embodiment of the invention, the object is achieved by an arrangement including a terminal closure having an insertion opening which is routed into the housing interior from the outside in the form of a stepped opening, a region of the stepped opening close to the housing interior having a small step with a relatively small radial extent and another region of the stepped opening close to the outer side of the terminal closure having a large step with a relatively large radial extent. The arrangement further includes a connecting element with an axial through-opening and which can be inserted from outside into the insertion opening into an installed position and is fixed in the installed position. In the installed position, an axial journal piece of the connecting element protrudes into the housing interior through the small step of the stepped opening and an axial retaining region is disposed in the large step of the stepped opening. The arrangement further includes a cable sleeve through which the cable that passes through the through-opening of the connecting element is routed to the outside and which, by way of one of its ends, encloses the retaining region and is in radially encircling contact, with elastic prestress, both with the radially encircling lateral surface of the retaining region and also with the radially encircling inner surface of the large step of the stepped opening.

To assemble this embodiment, the cable is first routed from the housing interior through the insertion opening of the terminal closure to the outside and further through the through-opening of the connecting element and the cable sleeve. After this step, the connecting element and cable sleeve are not yet mounted on the terminal closure. The cable sleeve is first arranged on the connecting element, if it is not already so arranged. The connecting element with the cable sleeve mounted thereon is then inserted into the stepped bore into the installed position. Here, the region of the cable sleeve that encloses the retaining region of the connecting element comes, under elastic radial prestress, into sealing contact both with the radially encircling lateral surface of the retaining region and also with the radially encircling inner surface of the stepped opening.

The above-described assembly sequence can be carried out in a simple manner.

Since the sealing point between the cable sleeve and the stepped opening is located close to the outer side of the stepped opening, it is easy to monitor at this mouth of the stepped opening whether this sealing point actually also has a sealing effect. The visibility of a leak from the outside also results in a reduction in reclamation costs.

The inventive configuration of stepped opening, connecting element and cable sleeve in different terminal closures allows cost-saving identical parts in the wide variety of linear actuating apparatuses.

The transition from the from the small step of the stepped opening to the large step can have any suitable form. For example, a right-angled transition is possible. Alternatively, a cone-shaped transition is also possible.

The cable sleeve is preferably composed of an elastic material, so that no additional sealing elements are required.

According to an embodiment of the present invention, the cable sleeve is connectable to the connecting element in an interlocking manner. This arrangement obviates the need for additional connecting elements. Therefore, assembly is also simple.

To this end, in another embodiment of the present invention, the retaining region of the connecting element has, on its radially encircling lateral surface, a radially encircling retaining groove into which a radially inwardly protruding annular attachment of the cable sleeve protrudes.

If the cable sleeve has a radially encircling, radially protruding sealing bead on its region which protrudes into the large step of the stepped opening, the region of the sealing bead is particularly elastic and provides an enhanced sealing effect.

In another embodiment of the present invention, the retaining region of the connecting element has a flange-like widened portion which can be made to bear axially against the annular face at the transition from the small step to the large step of the stepped opening in the installed position of the connecting element, at which position the retaining region of the connecting element is disposed in the large step of the stepped opening.

In yet another embodiment, a barb-like blocking attachment is arranged on that end region of the journal piece of the connecting element that protrudes into the housing interior. The blocking attachment is foldable against the lateral surface of the journal piece when the journal piece is inserted into the small step of the stepped opening and the blocking attachment being unfolded elastically radially outwards when the connecting element is in the installed position.

As a result, the blocking attachment engages behind the housing interior-side mouth region of the small step of the stepped opening and secures the connecting element against becoming unintentionally released from the installed position when the connecting element reaches the installed position of the connecting element. Further, it is then not possible to pull the connecting element out of the stepped opening solely by the application of axial force, without detaching the blocking attachment in the process. Therefore, the connecting element can be securely fitted on the terminal closure from the outside.

In a further embodiment of the present invention, the connecting element has a cross section which differs entirely or partially from a symmetrical cross section and the stepped opening has a corresponding cross section which differs entirely or partially from a symmetrical cross section, such that the connecting element can be fitted to the terminal closure only with a specific orientation.

Depending on the prespecified installation conditions of the linear actuating apparatus, the stepped opening can extend in an angular range of between 0° and 90° in relation to the longitudinal axis of the linear actuating apparatus.

This is particularly advantageous when the terminal closure has a connection piece, so that the cable sleeve and the connection piece can be oriented in different directions for easier assembly of connecting element and cable sleeve.

The connection piece, which can be a ball socket in one embodiment of the invention, can be oriented at an angle of between 90° and 270°, preferably about an angle of 180°, with respect to the orientation of the fitted cable sleeve.

In a preferred embodiment, the linear actuating apparatus is a spindle mechanism, the spindle drive motor of which is arranged in the housing interior and contacted by the cable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is illustrated in the drawings and will be described in more detail below.

DETAILED DESCRIPTION OF THE PREFERRED EMBODIMENTS

Figure 1:
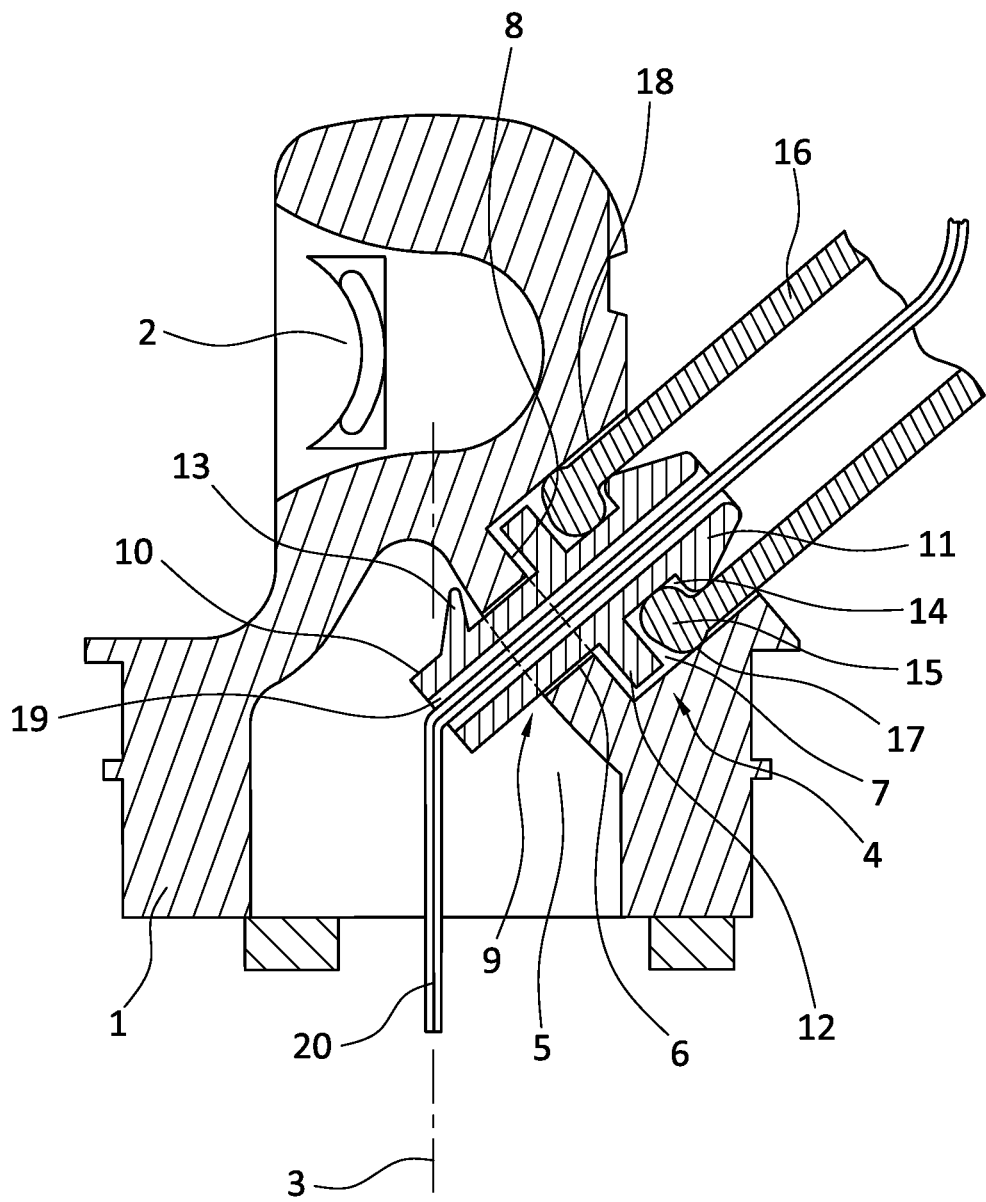
FIG. 1 is a longitudinal sectional view through a cable bushing arrangement according to an embodiment of the present invention.
Figure 2:
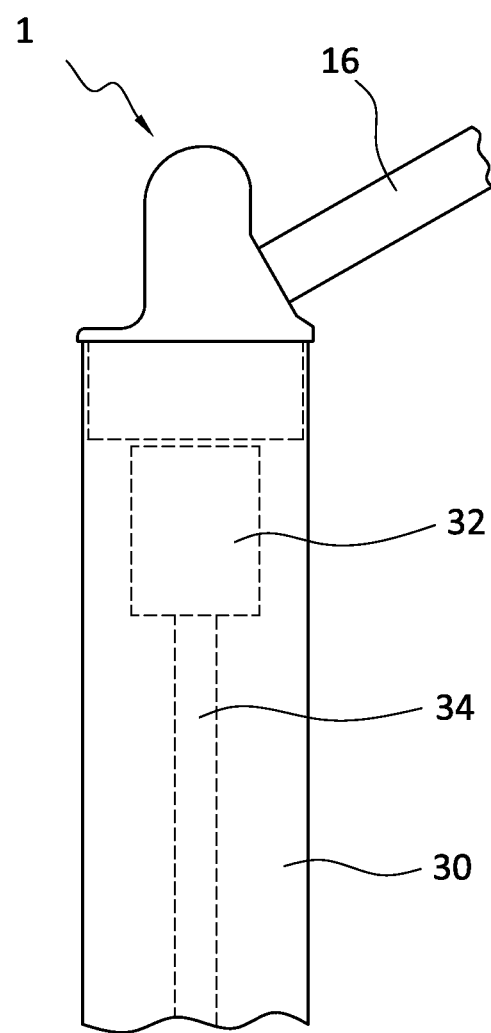
FIG. 2 is a partial side view of a housing with a terminal closure including the cable bushing arrangement of FIG. 1.

The cable bushing arrangement illustrated in FIG. 1 has a terminal closure 1 for a tubular housing 30 which forms a base piece. FIG. 2 shows an upper end of the tubular housing 30 in which an electric motor 32 for a spindle mechanism 34 which forms a linear actuating apparatus is arranged. The electric motor 32 and the spindle mechanism 34 are shown schematically in dashed lines in the housing.

Referring back to FIG. 1, a ball socket which forms a connection piece 2 is formed in the terminal closure 1, the ball socket being oriented at a right angle in relation to the longitudinal axis 3 of the housing 30.

The terminal closure 1 includes a stepped opening 4, which has a small step 6 of relatively small cross section, which small step issues into an inner side of the terminal closure 1 facing the housing interior 5 of the housing in an installed position, and a large step 7 of relatively large cross section, which large step is routed to the outer side of the terminal closure 1. The stepped opening faces away from the connection piece 2 such that the stepped opening 4 is oriented about 180° in relation to the orientation of the connection piece 2. A longitudinal axis of the stepped opening is also inclined through 45° in relation to the longitudinal axis 3.

An annular face 8 which extends at a right angle in relation to the longitudinal axis of the stepped opening 4 forms a transition from the small step 6 to the large step 7 in the stepped opening 4.

A connecting element 9 is inserted into the stepped opening 4. The connecting element 9 has an axial journal piece 10, which protrudes through the small step 6 of the stepped opening 4, an axial retaining region 11, which is disposed in the large step 7 of the stepped opening 4, and a flange-like widened portion 12, which is in contact with the annular face 8 of the terminal closure 1 in the large step 7 when the connecting element 9 is fully inserted into the stepped opening 4 in an installed position.

A barb-like blocking attachment 13 which can be folded elastically towards the retaining region 11 out of its radially outwardly folded blocking position is formed on that region of the journal piece 10 that protrudes into the housing interior 5. The barb-like blocking attachment 13 is folded during insertion of the connecting element 9 when the connecting element 9 is routed through the small step 6 of the stepped opening 4 from the outside as far as to the installed position. When the connecting element 9 reaches the installed position, the blocking attachment 13 has then reached a position fully in the housing interior 5 and the flange-like widened portion 12 is in contact with the annular face 8. In the installed position, the blocking attachment 13 is free to unfold radially outwards on account of its elasticity and prevents removal of the connecting element 9.

A radially encircling retaining groove 14 is formed on the radially encircling casing surface of the retaining region 11 in a manner adjoining the flange-like widened portion 12, and one end of the cable sleeve 16 includes an annular attachment 15 protruding into the retaining groove. The annular attachment 15 is composed of an elastic material and is in contact with the base of the retaining groove 14 with prestress.

The cable sleeve 16 furthermore has, in the region of the annular attachment 15, in a radially encircling outwardly projecting manner, a sealing bead 17 which is in contact with the radially encircling inner wall 18 of the large step 7 with prestress.

Owing to the contact of the annular attachment 15 with the base of the retaining groove 14 with elastic prestress and also the contact of the sealing bead 17 with the inner wall 18 of the large step 7 with elastic prestress, the connecting element 9 is arranged in a sealed-off manner in the stepped opening 4 and seals off the housing interior 5 towards the outside.

The connecting element 9 has an axial through-hole 19. A cable 20 is routed through the cable sleeve 16 and the through-hole 19 in the connecting element 9, in a manner sealed from the outside, into the housing interior 5 and can be connected to the spindle drive motor there. Although only one cable 20 is shown, a plurality of cables 20 may be routed through the cable sleeve 16.

Thus, while there has been shown and described and pointed out the fundamental novel features of the invention is applied to a preferred embodiment thereof, it will be understood that various omissions and substitutions and changes in the form and details of the devices illustrated, and in their operation, may be made by those skilled in the art without departing from the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. IL is the intention, therefore, to be limited only as indicated by the scope of the claims appended hereto.

LIST OF REFERENCE SYMBOLS

1 Terminal closure
2 Connection piece
3 Longitudinal axis
4 Stepped opening
5 Housing interior
6 Small step
7 Large step
8 Annular face
9 Connecting element
10 Journal piece
11 Retaining region
12 Flange-like widened portion
13 Blocking attachment
14 Retaining groove
15 Annular attachment
16 Cable sleeve
17 Sealing bead
18 Inner wall
19 Through-hole
20 Cable

What is claimed is:

1. A cable bushing arrangement for an electromotive linear actuating apparatus arranged in a housing, the cable bushing arrangement comprising:
a terminal closure configured to close the housing and having an insertion opening that extends through the terminal closure from an outer side to an inner side, the inner side facing an interior of the housing when the terminal closure closes the housing, the insertion opening being a stepped opening with a small step in a region proximate the inner side and a large step in a region proximate the outer side, the small step having a smaller radial extent than the large step;
a connecting element with an axial through-opening, the connecting element being insertable into the insertion opening to an installed position and having a journal piece and a retaining region, wherein the journal piece protrudes into the small step and the retaining region is disposed within the large step in the installed position, and the connecting element is fixed relative to the terminal closure in the installed position;
at least one cable routed through the axial through-opening of the connecting element;
a cable sleeve through which the at least one cable are routed, the cable sleeve having an end that encloses the retaining region of the connecting element in radially encircling contact with elastic prestress and also contacts with elastic prestress an inner surface of the large step of the insertion opening.

2. The cable bushing arrangement according to claim 1, wherein the cable sleeve is composed of an elastic material.

3. The cable bushing arrangement according to claim 1, wherein the cable sleeve is connected to the connecting element by an interlocking connection.

4. The cable bushing arrangement according to claim 3, wherein the end of the cable sleeve that encloses the retaining region of the connecting element has a radially inwardly protruding annular attachment, and the retaining region of the connecting element includes a radially encircling retaining groove into which the radially inwardly protruding annular attachment of the cable sleeve protrudes.

5. The cable bushing arrangement according to claim 1, wherein the cable sleeve has, on a region which protrudes into the large step of the stepped opening, a radially encircling and radially protruding sealing bead.

6. The cable bushing arrangement according to claim 1, the retaining region of the connecting element has a flange-like widened portion that bears axially against an annular face at the transition from the small step to the large step of the stepped opening when the connecting element is in the installed position.

7. The cable bushing arrangement according to claim 1, further comprising a barb-like blocking attachment arranged proximate a free end of the journal piece of the connecting element, the blocking attachment being folded against a lateral surface of the journal piece when the journal piece is inserted into the small step of the stepped opening and the blocking attachment being unfolded elastically radially outwards in the installed position of the connecting element.

8. The cable bushing arrangement according to claim 1, wherein the connecting element has a cross section which differs entirely or partially from a symmetrical cross section and the stepped opening has a corresponding cross section which differs entirely or partially from a symmetrical cross section.

9. The cable bushing arrangement according to claim 1, wherein the stepped opening has a longitudinal axis that extends in an angular range of between 0° and 90° in relation to the longitudinal axis of the housing when the terminal closure closes the housing.

10. The cable bushing arrangement according to claim 1, wherein the terminal closure has a connection piece for mounting the housing.

11. The cable bushing arrangement according to claim 1, wherein the linear actuating apparatus is a spindle mechanism, a spindle drive motor of which is arranged in the housing interior and contacted by the cable.

\* \* \* \* \*